H. B. HARTMAN.
ELECTRODE BOX.
APPLICATION FILED AUG. 11, 1911.
1,065,361.
Patented June 24, 1913.
2 SHEETS—SHEET 1.
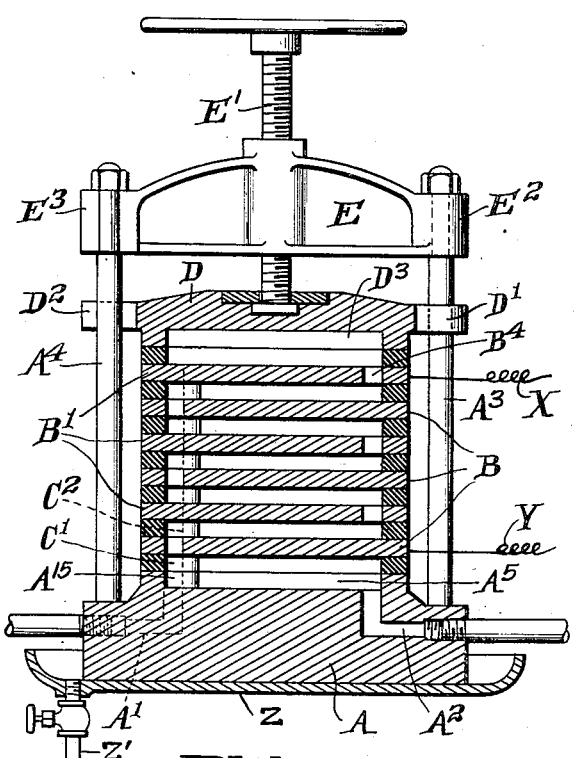
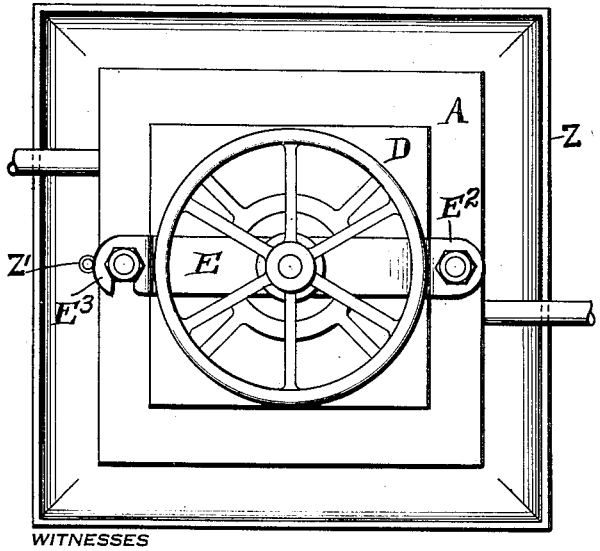
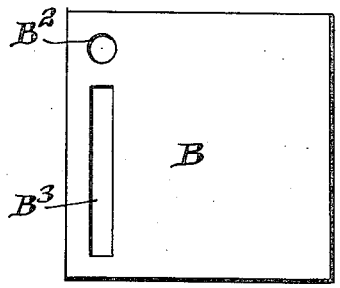
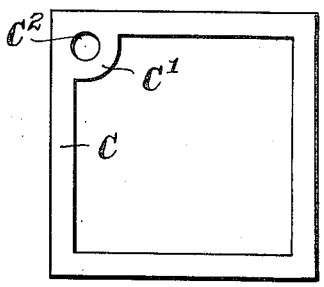
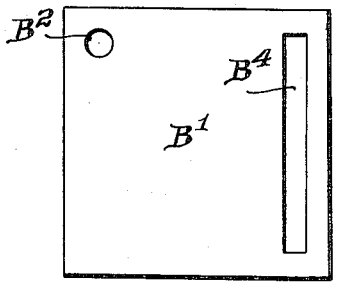
WITNESSES
INVENTOR
Harry B. Hartman
BY
ATTORNEY

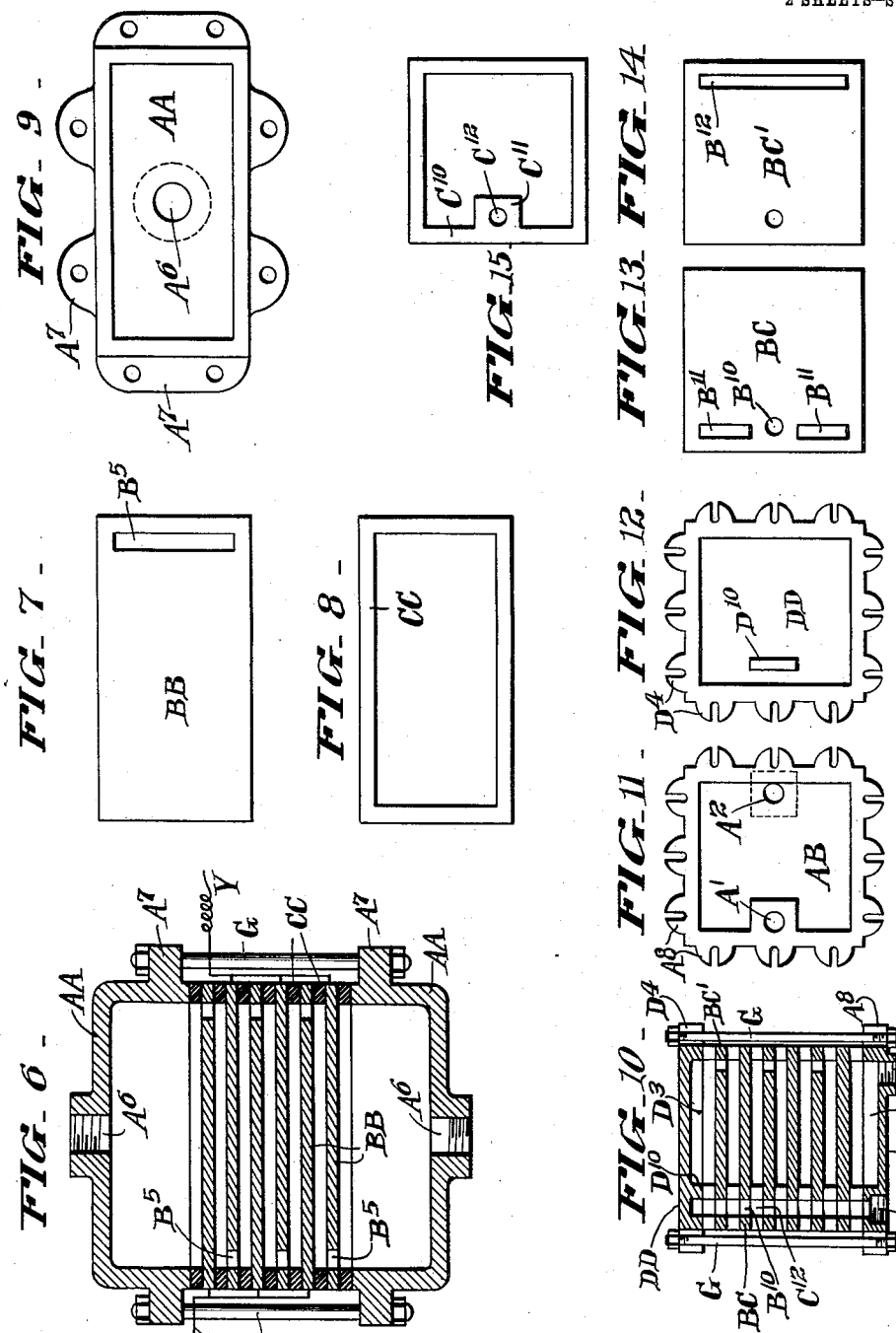

UNITED STATES PATENT OFFICE.

HARRY B. HARTMAN, OF PHILADELPHIA, PENNSYLVANIA, ASSIGNOR OF ONE-HALF TO HIMSELF AND ONE-HALF TO GEORGE A. DUNNING, OF PHILADELPHIA, PENNSYLVANIA.

ELECTRODE-BOX.

1,065,361. Specification of Letters Patent. Patented June 24, 1913.

Application filed August 11, 1911. Serial No. 643,474.

*To all whom it may concern:*

Be it known that I, HARRY B. HARTMAN, a citizen of the United States of America, residing in the city and county of Philadelphia and State of Pennsylvania, have invented a certain new and useful Improvement in Electrode-Boxes, of which the following is a true and exact description, reference being had to the accompanying drawings, which form a part thereof.

My present invention relates to electrode boxes, such as are employed in the purification of water and in other electrolytic operations and particularly those in which the liquid to be electrolyzed is under some substantial pressure in the electrode containing chamber.

The main object of the present invention is to provide an electrode box for the purpose specified which is simple in construction and efficient in operation.

More specifically, the object of the invention is to provide an electrode box from which the electrodes may be readily removed for cleaning or replacement, and in which it is possible to readily adjust the distance between the electrode plates and the electric connections thereto.

In carrying out my invention I form my electrode box by clamping together a stack of spaced apart electrodes with suitable insulating material interposed between the adjacent pairs of electrodes at their edges to close the space between each adjacent pair of electrodes at its margin, and I provide the electrodes with ports whereby the fluid to be electrolyzed is caused to flow in a zigzag path from one end of the stack of electrodes to the other. In practice I prefer to clamp the stack of electrode plates between end members, to one or both of which I attach the external conduit connections.

The various features of novelty which characterize my invention are pointed out with particularity in the claims annexed to and forming a part of this specification. For a better understanding of the invention, however, and the advantages obtained with its use, reference should be had to the accompanying drawings and descriptive matter in which I have illustrated and described several of the forms in which the invention may be embodied.

Of the drawings, Figure 1 is a sectional elevation of one form of electrode box. Fig. 2 is a plan of the apparatus shown in Fig. 1. Fig. 3 is a plan of one of the two forms of electrodes employed in the construction shown in Figs. 1 and 2. Fig. 4 is a plan of the insulation member or gasket employed in Figs. 1 and 2. Fig. 5 is a plan of the second form of electrode employed in the construction shown in Figs. 1 and 2. Fig. 6 is a sectional elevation of a modified electrode box. Fig. 7 is a plan view of one of the electrodes employed in the box shown in Fig. 6. Fig. 8 is a plan of the insulating gasket employed in the box shown in Fig. 7. Fig. 9 is a plan of one of the end members of the box shown in Fig. 6. Fig. 10 is a sectional elevation of a third form of electrode box. Fig. 11 is a plan of the bottom end member of the box shown in Fig. 10. Fig. 12 is an inverted plan of the top end member of the box shown in Fig. 10. Fig. 13, is a plan of one of the two forms of electrodes employed in the box shown in Fig. 10. Fig. 14 is a plan of the other form of electrode employed in the box shown in Fig. 10, and Fig. 15 is a plan of the gasket employed in the electrode box shown in Fig. 10.

In the drawings and referring first to the construction shown in Figs. 1–5 inclusive, A, represents the base member of the electrode box, which, as shown, is formed with an inlet passage $A'$ and an outlet passage $A^2$ which open at the upper side of the base member. On the base member are stacked the electrodes, of which there are two alternately disposed forms B and B'. Each electrode is separated by a space from the adjacent electrode or electrodes, and the top and bottom electrodes are spaced away from an upper end member D and the base member A respectively, by insulation C. As shown, the end member D is connected to the lower end of a screw $E'$ mounted in a crosshead E. This crosshead E is formed at one end with an apertured ear $E^2$ through which passes a post $A^3$ connected at its lower end to the base member A, and is formed at the opposite end with a slotted eye $E^3$ adapted to swing into and out of engagement with a post $A^4$ secured to the base member on the opposite side of the stack of electrodes from the post $A^3$. The follower D is similarly provided with an apertured ear $D'$ slidingly received on the post $A^3$ and with a slotted ear $D^2$ at its opposite end adapted to receive the post $A^4$. The base member A, posts $A^3$ and $A^4$, crosshead E, screw $E'$ and end member D form the main constituent parts of a press of common form, the end member D corresponding to the movable platen of the press. The end member D and crosshead E may be quickly and easily swung into and out of position in which they extend above the stack of electrodes and interposed insulation. The electrodes B and $B'$ are alike in that each is a plate-like body of suitable electrode material, such as iron, and each is formed with an aperture $B^2$ adapted to register with the upper end of the inlet passage $A'$ in the base member A. Each of the electrodes B is formed at one side with an elongated slot or port $B^3$ and each electrode $B'$ is formed with a similar elongated slot or port $B^4$, but these slots $B^3$ and $B^4$ are so arranged with respect to the apertures $B^2$ that when the electrodes are assembled the slots $B^3$ of the electrodes B are in register at one side of the stack and the slots $B^4$ are in register at the opposite side of the assembled stack. The insulation C may be formed of any suitable material, though I consider vulcanized fiber to be particularly good for this purpose. In the preferred construction illustrated, the insulation at each side of each electrode is in the form of a one piece gasket in the shape of a rectangular rim, so to speak, enlarged at one corner $C'$ to provide a wall surrounding an aperture $C^2$ so disposed as to register in the assembled stack with the apertures $B^2$. When the parts are assembled with the stack of electrodes and the interposed insulation clamped in place to make tight joints, the apertures or ports $B^2$ and $C^2$ in the electrodes and interposed insulation gaskets C unite to form a channel extending upward from the mouth of the inlet passage $A'$ to the top of the stack of electrodes. The slots or ports $B^3$ and $B^4$ unite with interelectrode spaces to provide a zigzag channel leading from one end of the box to the other. Advantageously the uppermost gasket may have the aperture $C^2$, or rather the enlarged portion $C'$ in which this aperture is formed, omitted. In any event I consider it ordinarily desirable to form recesses as indicated at $A^5$ and $D^3$ in the members A and D respectively, so that the depths of the chambers at the top and bottom of the electrode stack proper exceed the thickness of the insulation gaskets. As shown in Figs. 1 and 2, the base member A is mounted in the drip pan Z which serves to collect water which may leak from the electrode box. $Z'$ represents a valved drain pipe connection from the drip pan Z. The boss $A^{15}$ separates passage $A'$ from recess $A^5$.

In the construction shown by Figs. 6, 7, 8 and 9, the electrodes BB are all alike, each being in the form of an elongated rectangle with a slot $B^5$ adjacent one end. The electrodes BB are placed in the assembled stack so that the slots $B^5$ in adjacent electrodes are at opposite sides of the stack. The insulation gaskets CC, employed in this construction are in the form of simple open rectangular frames. The two end members AA in this construction are alike, each being in the form of an open ended box with a central orifice $A^6$ into which a conduit may be connected and each being provided with apertured ears $A^7$ at its sides to receive the clamping bolts G by means of which the electrode box is detachably clamped together.

The electrode box construction illustrated by Figs. 10 to 15 inclusive comprise a lower end member AB generally like the end member A except that the inlet and outlet passages $A^{11}$ and $A^{12}$ open at the bottom of the end member and not at the sides. The upper end member DD, is generally like the end member D of the construction first described. In this form of the invention the end members AB and DD are formed with slotted ears $A^8$ and $D^4$ respectively, receiving the clamping bolts G by means of which the electrode box is detachably clamped together. The electrodes BC and $BC'$ are each formed with an aperture $B^{10}$ and the electrodes BC are formed with two short slots $B^{11}$ at opposite sides of the aperture $B^{10}$ while the electrodes $BC'$ are each formed with an elongated slot $B^{12}$ at the opposite side of the plate from the aperture $B^{10}$. The insulating gaskets $C^{10}$ are identical with the gaskets C first described except that the enlargement $C^{11}$ in which the aperture $C^{12}$ adapted to register with the inlet port $A^{11}$ and the electrode apertures $B^{10}$ is at the center of one side of the gasket. To prevent the electrodes and gaskets and particularly the upper ones from bulging at the inner side of the apertures $B^{10}$ and $C^{12}$, I preferably form a lug $D^{10}$ on the end member D to engage the upper gasket $C^{10}$ at the inner side of the aperture $C^{12}$.

With all of the forms of the invention disclosed it will be apparent that the flow of fluid to be electrolyzed takes place through the zigzag channel formed by the spaces between the adjacent pairs of electrodes and the elongated ports formed in the electrodes. In the construction shown in Figs. 1 and 9, the provision of the closed channel leading through the stack of electrodes and formed by registering apertures in the electrodes and insulation makes it possible to connect both the inlet and outlet conduits directly to one end member of the electrode box as is frequently desirable.

In the construction shown in Fig. 6, one of the current supply conductors X is separately connected to each of the electrodes B while the other current supply conductor Y is separately connected to each of the electrodes B'. With this arrangement the full potential between the conductors X and Y exists between each adjacent pair of electrodes. It is one of the important features of my invention, however, that many different arrangements of circuit connections may be employed in order to obtain the desired potential difference between the electrodes. For instance, as shown in Fig. 1, the supply conductor X is connected to the electrode plate at the top of the electrode box while the conductor Y is connected to the electrode plate at the bottom of the box. With this arrangement the difference of potential existing between each adjacent pair of electrodes will be only a fraction of the potential difference between conductors X and Y.

It will be apparent that by a mere change in the thickness of the insulation employed to space the electrodes apart, the distance between the electrodes and consequently the volume of the spaces between the electrodes and the intensity of current flow for a given potential difference between the supply conductors may be varied as desired through a wide range. It will be apparent also that the electrodes and gaskets may be readily removed for cleaning or replacement whenever this is desirable, notwithstanding the cementing action of the fluid treated on the joints exposed to it.

While in accordance with the provisions of the statutes I have illustrated and described the best forms of my invention now known to me it will be apparent to those skilled in the art that changes may be made in the form of the apparatus disclosed without departing from the spirit of my invention, and that certain features of the invention may sometimes be employed with advantage without a corresponding use of other features of the invention.

Having now described my invention what I claim as new and desire to secure by Letters Patent is,

1. An electrode box comprising in combination a stack of spaced apart electrode plates, each of which is formed with an elongated aperture extending along and adjacent to one of its edges, insulating material interposed between each adjacent pair of plates at their margins to close the edges of the spaces between the plates, said plates being arranged with said apertures extending through adjacent plates at opposite sides of said stack, whereby said apertures unite with the interplate spaces to form a zigzag channel through said stack, and means for clamping said plates and insulating material together.

2. An electrode box comprising a stack of spaced apart electrode plates formed with a series of registering apertures, insulating material interposed between said electrodes at their margins and formed with apertures registering with said electrode apertures whereby the edges of the spaces between the plates are closed and the walls of said apertures unite to form a passage through said stack of electrodes, said electrodes having other and non-registering ports extending through them which connect the spaces between the electrodes and unite with said spaces to provide a zigzag channel through the electrode stack, with provisions at one end of the stack connecting said passage and channel, and conduit connections to said passage and channel at the opposite end of said stack and means for clamping said electrodes and interposed insulating material together.

3. An electrode box comprising a stack of spaced apart electrode plates formed with a series of registering apertures, insulating material interposed between said electrodes at their margins and formed with apertures registering with said electrode apertures whereby the edges of the spaces between the plates are closed and the walls of said apertures unite to form a passage through said stack of electrodes, said electrodes having other and non-registering ports extending through them which connect the spaces between the electrodes and unite with said spaces to provide a zigzag channel through the electrode stack, a base member formed with inlet and outlet ports on which said electrode stack is placed with one of said ports communicating with said passage and the other with said channel, standards at the sides of said stack and connected at their lower ends to said base member, a crosshead secured to the other ends of said standards, a clamping screw working in said standard and an end member for said stack engaged by said screw and formed with a chamber connecting the corresponding ends of said passage and channel.

4. An electrode box comprising a stack of spaced apart electrode plates formed with a series of registering apertures, insulating material interposed between said electrodes at their margins and formed with apertures registering with said electrode apertures whereby the edges of the spaces between the plates are closed and said apertures unite to form a passage through said stack of electrodes, said electrodes having other and non-registering ports extending through them which connect the spaces between the electrodes and unite with said spaces to provide a zigzag channel through the electrode stack, end members between which said electrodes and insulations are clamped, one of said end members being formed with inlet and outlet ports, one communicating with one end of said passage and the other with the corresponding end of said channel, and provisions at the opposite end of said stack from the last mentioned end member for connecting said passage and channel.

HARRY B. HARTMAN.

Witnesses:
 ARNOLD KATZ,
 S. STEWART.